Figure 1:
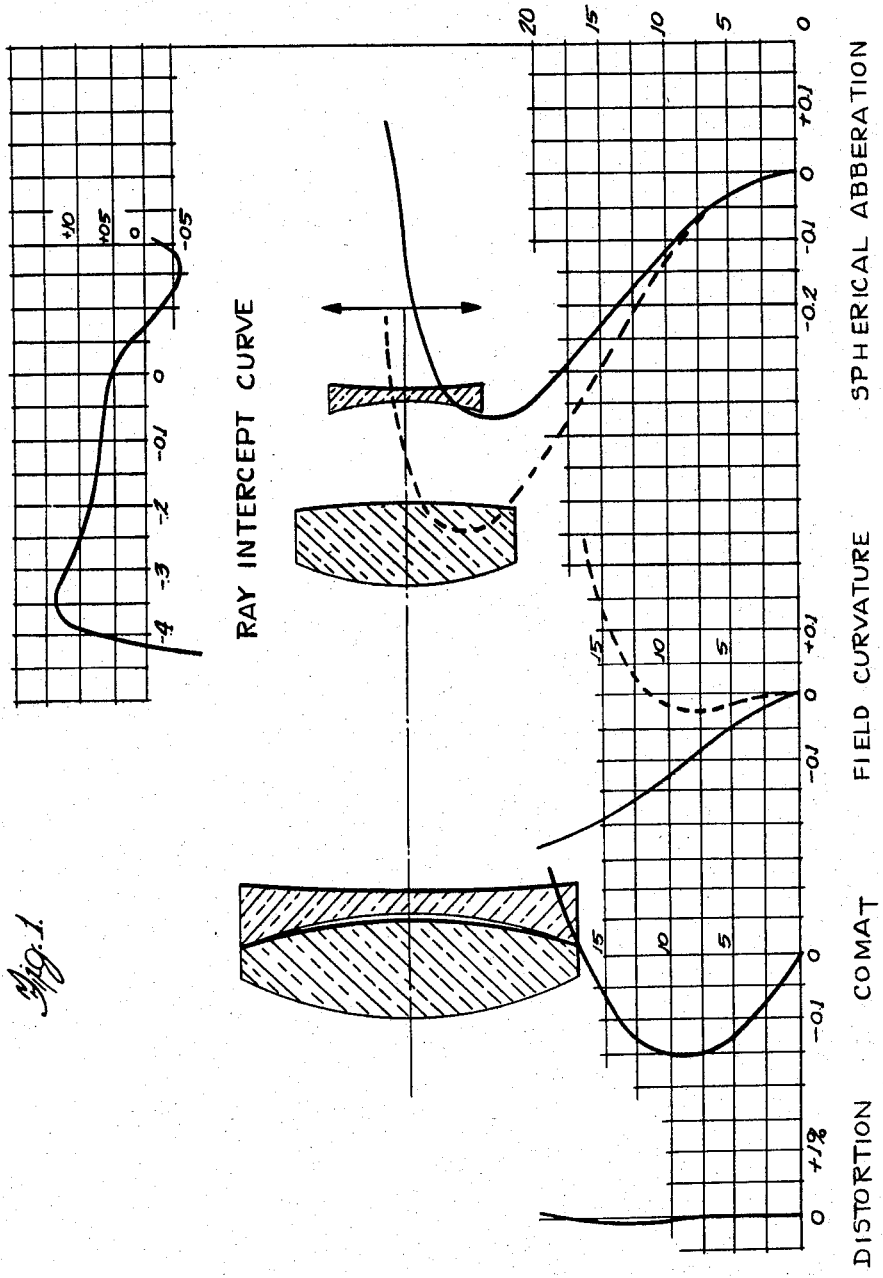

INVENTOR
Warren J. Smith

United States Patent Office 3,255,664
Patented June 14, 1966

3,255,664
OBJECTIVE OF THE PETZVAL TYPE WITH FIELD FLATTENER AND THREE OR MORE POSITIVE ELEMENTS
Warren J. Smith, Santa Barbara, Calif., assignor to Simpson Optical Company, a division of Infrared Industries, Inc.
Filed Nov. 30, 1962, Ser. No. 241,303
2 Claims. (Cl. 88—57)

The present invention relates to projection objectives, and more particularly to objectives of the Petzval type with a field flattener, the combination containing at least three positive elements.

One of the primary objectives of the invention is to produce a photographic objective of high relative aperture in which an exceedingly high sharpness of image and definition is maintained over the entire field of view, and yet the inherent production costs of the lens are held at an economical level.

Another closely related object of the invention is to provide a photographic objective in which only two specific material types are specified for its manufacture, and additionally which is adapted to the employment of two plano surfaces thereby inherently reducing production costs. Additionally, the elimination of doublets through the design effectively eliminates the necessity for cementing elements, and thereby contributes to the economical manufacture of the subject objective.

This lens may be considered as a derivative from the Petzval type of projection lens which consists of two widely spaced achromatic doublets, the usual arrangements of which is that the front doublet has about twice the focal length of the combination, the rear doublet has about the same focal length as the combination and the air space between is approximately equal to the focal length of the combination. The Petzval projection lens is capable of forming an excellent image in the region of the optical axis; off the axis, however, it is afflicted with a large curvature of field. Its image is formed on an inward curved surface with a radius approximately equal to the focal length; thus the quality of the image away from the axis tends to be poor.

To correct this defect, a negative lens is often introduced near the focal plane, where it contributes very little power to the system. The negative lens introduces field curvature of opposite sign (i.e., backward curving) and its power is chosen so that its curvature approximately cancels the inward curvature of the basic Petzval lens. The negative lens is often referred to as a field-flattener for this reason.

By suitable choice of optical glasses and properly balancing the powers and spacings of the elements, it is already known that it is possible to combine the function of the field flattener element and the flint element of the rear doublet to produce a lens consisting of only four elements, which has a flattened field curvature. This type of system can be corrected for both lateral and longitudinal chromatic aberration, Petzval sum, marginal spherical aberration, coma, distortion and astigmatism. The back focal distance can be made large enough to avoid any difficulty due to proximity to the focal plane.

The standard Petzval lens both with and without a field flattener can be corrected for satisfactory imagery at speeds of f/1.6 for use as a 2-inch focal length projection lens for 16 mm. film. The four element field flattener is a "marginal" design for this application. Although it has excellent sphero-chromatic correction, the zonal residual of spherical aberration tends to be larger than in a standard Petzval lens. If steps are taken to reduce this zonal spherical, the residuals of coma become large. Fifth order coma of the elliptical type (which varies with the cube of the image height rather than directly with the image height as does third order coma) and fifth order linear coma (which varies as the fourth power of the semi-aperture) both degrade the image quality and cause the design to be extremely sensitive to the effects of small decentrations of the elements introduced in fabrication. These factors limit the usefulness of this four element design to low speeds or short focal lengths.

Figure 2:
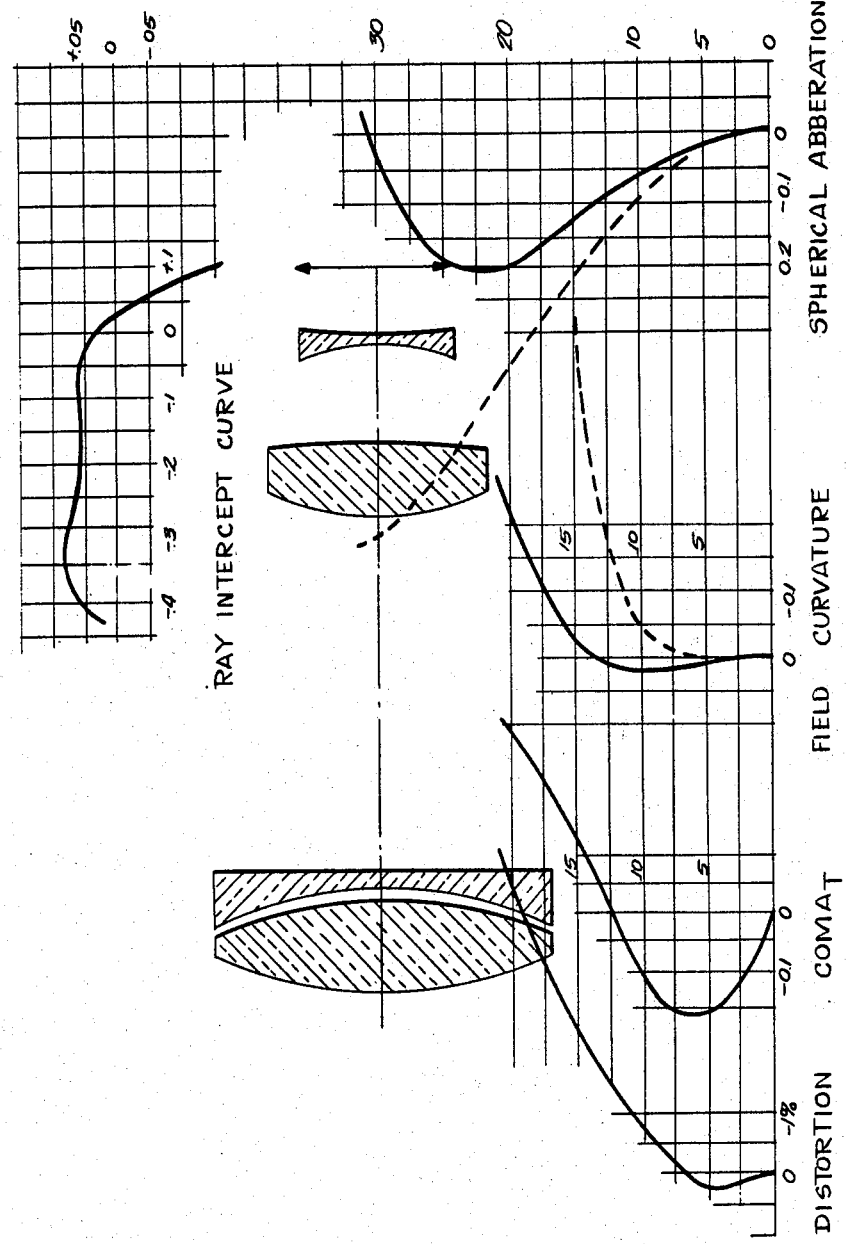

This invention relates to an improvement over the prior art four element lens system as illustrated in FIGURES 1 and 2 by the use of (a) two positive crowns in the front member, or (b) two positive crowns in the rear member, or (c) at least two positive crowns in both the front and rear members. Such a lens system is corrected for chromatic aberration, spherical aberration, coma, astigmatism, and the Petzval sum, and further in accordance with the invention, the front positive Petzval member and the rear negative field flattener member are over-corrected for longitudinal chromatic aberration. The rear Petzval member is under-corrected for longitudinal chromatic aberration, and the Petzval portion of the lens has at least three positive lens elements, while the rear Petzval member has at least one positive element.

FIGURE 1 shows the four element field flattener objective illustrative of existing lens systems with the aberration curves thereon. This particular design form has fairly good angular coverage but suffers from a large spherical aberration zonal residual, as shown in the graph in the lower right hand corner of the figure. The field aberrations are relatively well corrected as can be seen from the symmetry of the ray intercept curve, the relatively small amounts of distortion and the relatively well-controlled field curvatures. The graphs are (starting at the upper right-hand corner with the ray intercept curve):

The ray intercept curve shows the intercept height of rays with the final paraxial focal plane. The ordinate of this curve is height from the axis, the abscissa is the tangent of the final slope angle which the ray makes with the axis.

In the lower row of graphs, the left-hand graph shows a plot of distortion expressed as a percentage of image height against image height;

The second graph is a plot of the tangential coma against image height;

The third graph is a plot of the sagittal and tangential image curvatures against image height. The sagittal curvature is shown as a solid line, the tangential as a dashed line;

The fourth graph is a plot of spherical aberration and delta-$f$ against the incident ray height of each ray on the first surface of the system. The solid curve is the longitudinal spherical aberration; the dashed curve is the difference between the focal length of the marginal ray and the paraxial focal length.

Figure 3:
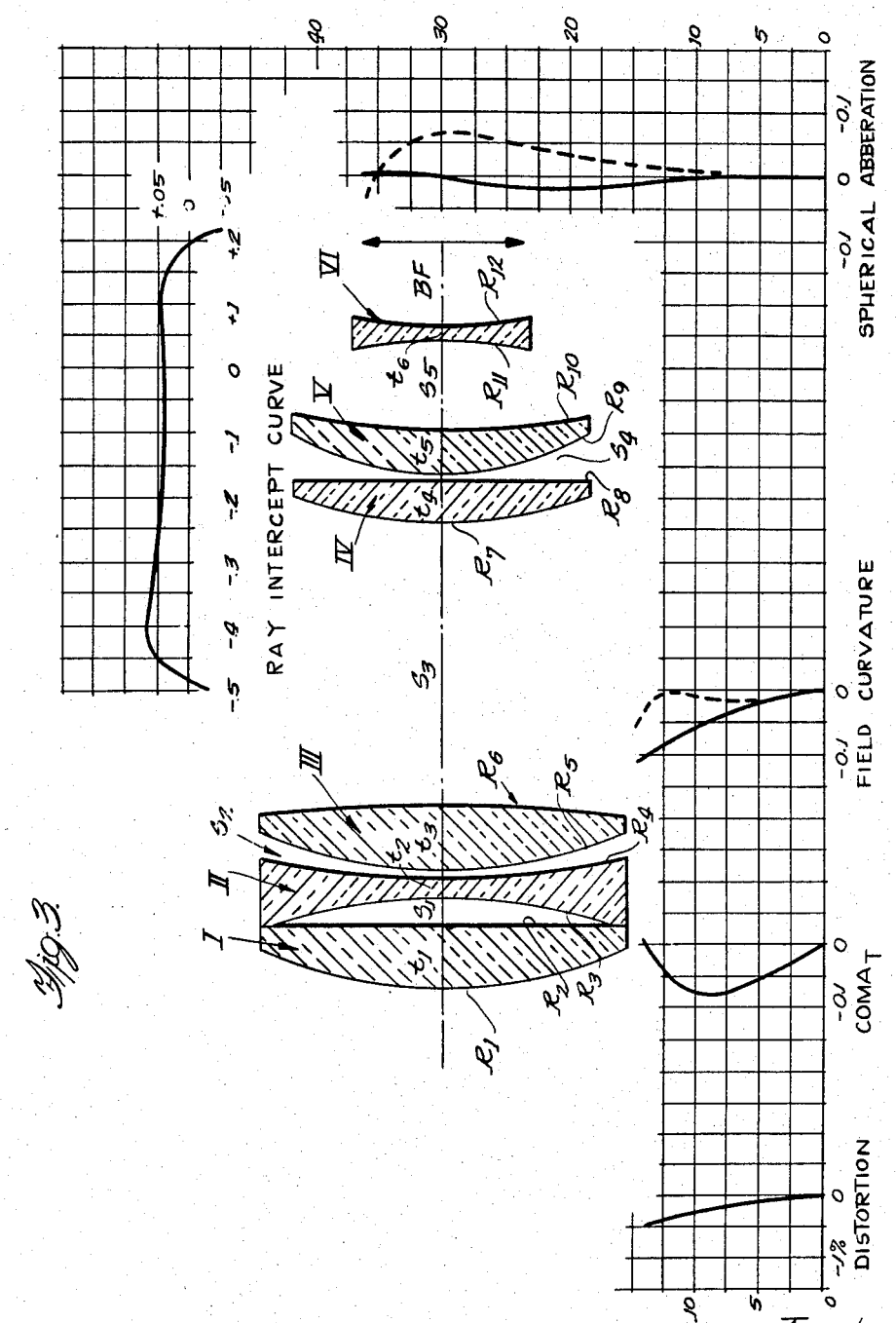

The same techniques for presenting the aberration curves as employed in FIGURE 1 are also utilized in FIGURES 2 and 3, and, as will be observed in FIGURE 3 which is descriptive of an ideal design made in accordance with the invention, the elimination of some of the aberrations exemplified in FIGURES 1 and 2 will become apparent.

FIGURE 2 shows another version of the four element field flattener system illustrative of existing lens systems in which an attempt has been made to reduce the large spherical aberration residual as exemplified in FIGURE 1. As a result of the design changes necessary to achieve this, the off-axis aberrations have been increased. This can be seen from the asymmetry of the ray intercept curve which indicates higher order coma and can also be seen from the distortion curve which departs radically from a zero value at higher angles of obliquity and from the field curvature graph which shows that the focal surfaces off the axis depart rapidly from the ideal flat plane at high obliquity. It will be noted that the variation of coma against image height is much more pronounced in this lens than in the lens shown in FIGURE 1. The degraded state of the coma correction can also be deduced from the increased separation between the delta-$f$ and the spherical aberration curves in the lower right hand plot. The separation between these two curves is a measure of the variation of coma across the aperture of the lens.

FIGURE 3 shows a representation of a six element version of the invention. The aberration plots strongly indicate the great improvement in image quality which the invention has made possible. The spherical aberration is ideally corrected with almost no residual aberration. The ray intercept curve, while not perfectly symmetrical, shows a considerably reduced amount of higher order coma from that shown in FIGURE 2. The field curvature graph indicates a markedly reduced amount of higher order astigmatism, as can be seen from the fact that the curves maintain a more nearly straight alignment with the vertical axis. The distortion is well corrected and shows no evidence of any higher order variation. The plot of coma against image height is markedly improved in that the variation of the aberration with image height and the total residual are greatly reduced. These improvements have been achieved at the same time that the relative aperture of the objective has been increased from $f/1.6$ to $f/1.4$ and the back focal distance has been somewhat increased as well.

Basic description of the system

A system illustrative of the invention, shown in FIG. 3, has three components. Starting from the long conjugate, the front component is positive (i.e., converging), the middle component is positive, and the rear component is negative (i.e., diverging). The front component includes two positive elements and one negative element. The middle component includes two positive elements. The rear component is a single negative element. The positive elements are of crown glass and the negative elements are of flint glass. It will be realized that, within the scope of the invention a number of configurations are possible, even when the invention is applied to a design form with a specific number of elements. The following description applies to a six element version of the invention.

The space between the front and middle components is large, approximating half of the focal length of the entire lens. The space between the middle and rear components is smaller, usually approximating 15% or 20% of the focal length. The elements of the front component may be arranged in any sequence. In the design shown, the negative element is placed between the two positive components, and is biconcave in shape. The second positive front element in this arrangement is preferably biconvex with the stronger surface toward the front. The preferred shape of the first positive element may be biconvex, convex-plano, or meniscus (convex to the front), depending on the exact shape and powers of all the elements. The crowns of the front in the preferred embodiment are made approximately equal in power, to minimize aberrations and reduce fabrication costs.

The two crowns of the middle component in the preferred embodiment are made approximately equal in power and both have their first surfaces convex to the front. The shape of the middle component positive elements may be either meniscus (convex toward the front) or convex-plano or biconvex with the front surface much the stronger. The second element is preferably more meniscus than the first, but this is not necessary, and if desired, both elements can be identical. The crown elements of the front and middle components may be made unequal in power, without departing from the invention.

The rear component is a single element, preferably biconcave. The front surface is usually stronger than the rear, although this can be reversed. A concave-plano, or even slightly meniscus form for the rear component is possible.

The subject objective lens is not especially sensitive to glass choice. In the design described, dense barium crowns and extra dense flints have been used. The new higher index crown glasses (rare earth glasses) may be used to produce a better lens. The flints are selected from the dense flint type with a low V-value, to keep the element powers low. The rear component should employ a flint of this type to achieve the most favorable distribution of powers.

A variety of lens designs embodying the invention may be derived in accordance with accepted design techniques. As an example of such application of design technique, a system of thick lenses may (for convenience) be represented by an equivalent system of "thin lenses," that is, hypothetical elements whose thickness is mathematically considered to be zero. Using this thin lense fiction, specific expressions may be derived for the focal length, back focal distance, Petzval curvature, longitudinal and lateral color in terms of the powers of the elements. It is possible to make a simultaneous solution of these equations to determine the necessary powers and spacings which will yield the desired values of e.f.l., b.f.l., xptz (curvature of the Petzval field), Lch and Tch. When these are determined, real thickness and spaces are inserted into the system and the shapes of the elements are varied to correct the other aberrations. The simultaneous equations are set up as described below. A ray from the axial point of the object is traced through the rim of the thin elements and another is traced from an off-axis object point through the center of the pupil. The rays are traced by means of iterative application of the following expressions:

$$U'_n = U_n + Y_n \phi_n$$
$$Y_{n+1} = Y_n - dU'_n$$
$$U_{n+1} = U'_n$$

where $U_n$ is the slope of the ray with respect to the optical axis before it strikes element $n$. The power of the $n$th elements is $\phi_n$ and the height at which the ray strikes the element is $Y_n$. The distance between elements $n$ and $n+v$ is $d$. Th equantities of the ray from the off-axis point are designated by bars (e.g., $\bar{u}, \bar{y}$) and the ray data from the axial point are represented by plain symbols.

The characteristics of a system of thin lenses can then be represented by the following set of expressions. If the object is at infinity (i.e., if $u_1=0$) the focal length of a system of K elements is given by $$\text{e.f.c.} = y_1/u_k' = y_1 \bigg/ \sum_{i=1}^{k} y_i \phi_i$$

The back focal distance is given by $$\text{b.f.l.} = y_k/u_k' = y_k \bigg/ \sum_{i=1}^{k} y_i \phi_i$$

The Petzval curvature of the image is given by $$P.C. = -\frac{1}{2}h^2 \sum_{i=1}^{k} \frac{\phi_i}{N_i}$$

where $h$ is the final image height and $N_i$ is the index of refraction of element $i$.

The longitudinal chromatic aberration is given by $$LchA = \frac{(-1)}{U_k'^2} \sum_{i=1}^{k} \frac{y_i^2 \phi_i}{V_i}$$

Where V is the reciprocal relative dispersion of the material comprising element $i$ and is given by $$V = \frac{N_d - 1}{N_f - N_c}$$

where $N_d$, $N_f$, and $N_c$ are the indices of refraction of the glass for middle, short and long wavelengths of light respectively (usually the $d$, $f$, and $c$ spectral lines for visual work). The lateral color is given by $$Tch\ C = -\frac{1}{U_k'} \sum_{i=1}^{k} \frac{Q_i y_i^2 \phi_i}{V_i}$$

where $Q_i = \bar{y}_i / y_i$

Based on the requirements of the application for the objective, a suitable number of elements is chosen for the purposes of the thin lens equations. The elements in the front member are assumed to be in contact, that is, with zero spacing, the elements of the rear Petzval member are assumed to be in contact and the elements of the field flattener member are assumed to be in contact. The five equations described above are set up for the chosen number of elements.

Because the invention contemplates at least five elements and two air spaces there are at least seven degrees of freedom, or seven variables in each equation. Since we have only five equations there are more variables than are necessary for simultaneous solution. Thus a constraint among the variables may be established to enable a single solution. Typical constraints as deemed suitable for the application might be among the following:

A constraint on the height at which the marginal ray strikes the second member of the Petzval portion of the objective;

A constraint which would be a proportionality between the powers of the positive or among the powers of the negative elements of a member; or A constraint relating the proportion of powers between the members.

Enough constraints to reduce the independent variables to five are applied to the equations. A simultaneous solution of all the equations will then produce a thin lens layout of the powers of all the elements and the spacings between the members.

This procedure yields a prescription for the element powers and the spacings between them, after appropriate thickness has been introduced into the elements and the member spacings have been duly adjusted to compensate for the introduction of thickness. At this point it is often necessary to adjust the "desired" thin lens values of Petzval and Chromatic in the simultaneous equations and to resolve the equations (so that the effects of thickness are compensated for).

The shapes of the elements are now adjusted to secure a simultaneous correction of spherical aberration, coma, astigmatism and distortion. Obviously, there are more shapes available for adjustment than are necessary to correct the four aberrations, since a five or more element lens is pre-supposed. These shapes are utilized to control the residual aberrations.

By following the above design technique, and within the scope of the invention, a preferred six-element lens design to the following specifications has been developed—

A positive element, a negative element, a second positive element, a third positive element, a fourth positive element and a second negative element in that order, in which the following algebraic inequalities hold true:

$0.5F < R1 < 2.0F$
$-2.5/F < 1/R2 < 1.0/F$
$-1.5F < R3 < -.7F$
$1.5F < R4 < 10.0F$
$0.7F < R5 < 1.5F$
$-8.0F < R6 < 2.0F$
$0.5F < R7 < 1.5F$
$-0.2/F < 1/R8 < +1.0/F$
$0.4F < R9 < 1.2F$
$1.0F < R10 < 10.0F$
$-1.0F < R11 < -0.3F$
$-.3/F < 1/R12 < 1.7/F$
$.2F < T1+S1+T2+S2+T3 < .5F$
$0.25F < S3 < 1.0F$
$0.1F < T4+S4+T5 < 0.3F$
$0.1F < S5 < 0.3F$
$.01F < T6 < 0.1F$
$50 < V1 < 65$
$25 < V2 < 50$
$50 < V3 < 65$
$50 < V4 < 65$
$50 < V5 < 65$
$25 < V6 < 50$
$1.5 < N1 < 2.0$
$1.5 < N2 < 2.0$
$1.5 < N3 < 2.0$
$1.5 < N4 < 2.0$
$1.5 < N5 < 2.0$
$1.5 < N6 < 2.0$
$.01F < BF < .25F$

Where R denotes the radii of curvature of the optical surfaces, N the refractive indices of the elements, V the reciprocal relative dispersion of the elements, S the axial spaces between elements, T the axial thicknesses of the elements, BF the axial distance from R12 to the focal plane and F denotes the effective focal length of the objective as a whole.

An ideal application of the invention to a six element system is expressed in the following table:

| Lens | N | V | Radii | T |
|---|---|---|---|---|
| 1 | 1.611 | 58.8 | R1=+89.6 | t1=12.7 |
|   |       |      | R2=plano | s1=5.48 |
| 2 | 1.720 | 29.3 | R3=−120.2 | t2=4.89 |
|   |       |      | R4=+257.3 | s2=0.587 |
| 3 | 1.611 | 58.8 | R5=+106.3 | t3=12.9 |
|   |       |      | R6=−333 | s3=55.4 |
| 4 | 1.611 | 58.8 | R7=+88.3 | t4=9.0 |
|   |       |      | R8=plano | s4=0.587 |
| 5 | 1.611 | 58.8 | R9=+56.9 | t5=9.4 |
|   |       |      | R10=+170.2 | s5=16.9 |
| 6 | 1.720 | 29.3 | R11=−71.8 | t6=2.54 |
|   |       |      | R12=+79.7 |   | where the lens elements are numbered from front to rear in the first column, the corresponding refractive indexes N for the D wavelength and the conventional dispersive index V are given in the second and third columns, and the radii of curvature R of the lens elements, and the spaces $s$ between the components each numbered by subscripts from front to rear, are given in the last two columns for a focal length of 100 and an aperture of $f$ 1.4.

While the above design has been demonstrated as ideally illustrative of the invention, and has established a strong commercial significance, the following four designs are also acceptable, and further illustrative of the application of the invention to a six element configuration:

| | | | | |
|---|---|---|---|---|
| R1 | +105.8 | +83.2 | +78.5 | +90.6 |
| R2 | −75.5 | +1738. | +689. | +4410. |
| R3 | −113.2 | −123.8 | −127. | −127. |
| R4 | +322. | +314.3 | +226. | +278.5 |
| R5 | +106.4 | +89.5 | +89.5 | +106.3 |
| R6 | −362. | −581. | −570. | −382. |
| R7 | +88.5 | +70.3 | +65.6 | +65.6 |
| R8 | plano | +204.7 | +167.4 | +190. |
| R9 | +63.5 | +70.3 | +65.6 | +65.6 |
| R10 | +251.5 | +152.2 | +114.2 | +260. |
| R11 | −70.3 | −47.5 | −48.4 | −59.6 |
| R12 | +86.2 | +299.5 | +288. | +130.6 |
| T1 (N−1:V) | 12.2(611:588) | 13.(611:588) | 13.(620:603) | 12.4(611:588) |
| S1 | 4.96 | 5.97 | 6.42 | 5.61 |
| T2 (N−1:V) | 4.92(720:293) | 4.92(751:278) | 4.92(720:293) | 4.92(720:293) |
| S2 | .59 | .59 | .59 | 0 |
| T3 (N−1:V) | 12.98(611:588) | 13.(611:588) | 13.(620:603) | 12.4(611:588) |
| S3 | 58.1 | 45.4 | 45.6 | 56.5 |
| T4 (N−1:) | 7.67(611:588) | 9.84(611:588) | 9.84(620:603) | 9.84(611:588) |
| S4 | .59 | .59 | .59 | 0 |
| T5 (N−1:V) | 7.67(611:588) | 9.84(611:588) | 9.84(620:603) | 9.84(611:588) |
| S5 | 19. | 16.1 | 16.0 | 18.31 |
| T6 (N−1:V) | 2.56(720:293) | 2.56(720:293) | 2.56(720:293) | 2.56(720:293) |
| Back Focus | 16.8 | 16.96 | 16.96 | 14.94 |

While the immediately preceding material has described a six-element design in which the front Petzval member contains two positive elements and the rear Petzval member contains two positive elements, an improvement on prior art is possible by a design which would embody either of the following alternatives:

(1) That the rear Petzval member contains a single positive element and the front Petzval member contains two positive elements; or (2) That the front Petzval member contains a single positive element and the rear Petzval member contains two positive elements.

As a further alternative either or both of the Petzval members may contain three or more positive elements as required by the application for the design.

As demonstrated above, numerous variations from these specific examples which have been set forth in detail are contemplated as falling within the scope of the subject invention. Equivalents well known in the field of lens design may be implied, as indicated in the immediate preceding paragraph, to increase the number of lens elements, and to accomplish certain reorientations still within the spirit and scope of the invention. Accordingly, it is not intended to limit the invention to any of the herein described techniques, or specific lens system, but rather to define the same in accordance with the claims which follow.

I claim:

1. An objective made substantially according to the specifications set forth in the following table:

| Lens | N | V | Radii | T |
|---|---|---|---|---|
| 1 | 1.611 | 58.8 | R1=+89.6 | $t_1$=12.7 |
| | | | R2=plano | $s_1$=5.48 |
| 2 | 1.720 | 29.3 | R3=−120.2 | $t_2$=4.89 |
| | | | R4=+257.3 | $s_2$=0.587 |
| 3 | 1.611 | 58.8 | R5=+106.3 | $t_3$=12.9 |
| | | | R6=−333. | $s_3$=55.4 |
| 4 | 1.611 | 58.8 | R7=+88.3 | $t_4$=9.0 |
| | | | R8=plano | $s_4$=0.587 |
| 5 | 1.611 | 58.8 | R9=+56.9 | $t_5$=9.4 |
| | | | R10=+170.2 | $s_5$=16.9 |
| 6 | 1.720 | 29.3 | R11=−71.8 | $t_6$=2.54 |
| | | | R12=+79.6 | | where the lens elements are numbered from front to rear in the first column, the corresponding refractive indexes N for the D wavelength and the conventional dispersive index V are given in the second and third columns, and the radii of curvature R of the lens elements are given in the fourth column and the spaces $s$ between the components and the thickness $t$ of the components, each numbered by subscripts from front to rear, are given in the last column for a lens of a focal length of 100 and a relative aperture of f:1.4.

2. An optical objective comprising six axially aligned and air spaced lens elements arranged from front to rear as follows: a positive element, a negative element, a second positive element, a third positive element, a fourth positive element and a second negative element in that order, in which the following algebraic inequalities hold true:

$$0.5F < R1 < 2.0F$$
$$-2.5/F < 1/R2 < 1.0/F$$
$$-1.5F < R3 < -.7F$$
$$1.5F < R4 < 10.0F$$
$$0.7F < R5 < 1.5F$$
$$-8.0F < R6 < 2.0F$$
$$0.5F < R7 < 1.5F$$
$$-0.2/F < 1/R8 < +1.0/F$$
$$0.4F < R9 < 1.2F$$
$$1.0F < R10 < 10.0F$$
$$-1.0F < R11 < -0.3F$$
$$-.3/F < 1/R12 < 1.7/F$$
$$.2F < T1+S1+T2+S2+T3 < .5F$$
$$0.25F < S3 < 1.0F$$
$$0.1F < T4+S4+T5 < 0.3F$$
$$0.1F < S5 < 0.3F$$
$$.01F < T6 < 0.1F$$
$$50 < V1 < 65$$
$$25 < V2 < 50$$
$$50 < V3 < 65$$
$$50 < V4 < 65$$
$$50 < V5 < 65$$
$$25 < V6 < 50$$
$$1.5 < N1 < 2.0$$
$$1.5 < N2 < 2.0$$
$$1.5 < N3 < 2.0$$
$$1.5 < N4 < 2.0$$
$$1.5 < N5 < 2.0$$

$$1.5 < N6 < 2.0$$
$$.01F < BF < .25F$$

where the subscripts are numbered from front to rear, and where R denotes the radii of curvature of the optical surfaces, N the refractive indices of the elements, V the reciprocal relative dispersion of the elements, S the axial spaces between the elements, T the axial thicknesses of the elements, BF the axial distance from R12 to the focal plane and F denotes the effective focal length of the objective as a whole.

References Cited by the Examiner

UNITED STATES PATENTS

| | | | |
|---|---|---|---|
| 1,843,519 | 2/1932 | Richter | 88—57 |
| 2,541,484 | 2/1951 | Schade | 88—57 |
| 2,989,895 | 6/1961 | Sandback | 88—57 |

JEWELL H. PEDERSEN, *Primary Examiner.*

JOHN K. CORBIN, *Examiner.*

R. STERN, *Assistant Examiner.*